United States Patent

Numata

[15] 3,643,561
[45] Feb. 22, 1972

[54] EXPOSURE CONTROL SYSTEM FOR A SINGLE LENS REFLEX CAMERA

[72] Inventor: Saburo Numata, Ohmiya, Japan

[73] Assignee: Fuji Shashin Koki Kabushiki Kaisha, Ohmiya-shi, Saitama, Japan

[22] Filed: Feb. 3, 1970

[21] Appl. No.: 8,219

[30] Foreign Application Priority Data

Feb. 3, 1969 Japan....................................44/7943

[52] U.S. Cl. ............................95/10 CT, 95/4 Z, 95/53 EB
[51] Int. Cl. ........................................................G03b 7/08
[58] Field of Search..............95/10 C, 4 Z, 64 R, 64 C, 53 R, 95/53 E

[56] References Cited

UNITED STATES PATENTS

| | | |
|---|---|---|
| 3,533,348 | 10/1970 | Akio Yanagi.....................95/10 C X |
| 3,324,779 | 6/1967 | Tsukumo Nobusawa et al..........95/42 |
| 3,460,450 | 8/1969 | Mamoru Ogihara...................95/10 C |
| 3,442,190 | 5/1969 | Erickson..............................95/10 C |
| 3,349,678 | 10/1967 | Minoru Suzuki et al...............95/10 C |

*Primary Examiner*—Joseph F. Peters, Jr.
*Attorney*—Sughrue, Rothwell, Mion, Zion & Macpeak

[57] ABSTRACT

A single-lens reflex camera which includes a photosensitive light sensor having diode characteristics and a hinged mirror that is swung out of the view finder optical system during shutter release. The shutter is electrically operated through a relay coil under the control of an electrical condenser connected to the relay coil for controlling shutter speed. The photoelectric sensor is series connected to a source of voltage. A switch coupled to the shutter selectively connects a pair of resistors in parallel with the condenser and in series with the sensor during shutter release.

2 Claims, 2 Drawing Figures

INVENTOR
SABURO NUMATA

EXPOSURE CONTROL SYSTEM FOR A SINGLE-LENS REFLEX CAMERA

BACKGROUND OF THE INVENTION

1. Field of the Invention

The present invention relates to an exposure control system for a single-lens reflex camera which employs an electrically operated shutter, and in particular, to an exposure control system for such a camera in which a photosensitive sensor is positioned within the view finder optical system of the camera for measuring the light falling upon the object being photographed. The present invention is advantageously applicable to such single-lens reflex cameras as the through-the-lens system camera wherein a hinged mirror forming a portion of the view finder optical system is swung out of the way and the photosensor is cut off from the incident light at the moment when the shutter is released.

2. Description of the Prior Art

In conventional single-lens reflex cameras of the through-the-lens system type, wherein the light sensor is disposed in the view finder optical system and behind the hinged mirror, which swings out of the way of the optical path when the shutter is releasing, the photosensor is cut off from the incident due to the swungup position of the mirror in the camera body during shutter release and it is impossible to measure the light value while actually taking the photograph. It is, therefore, necessary to provide some means for memorizing the light value of the scene to be photographed just before the shutter is released. For such a purpose, it has been proposed to employ an auxiliary sensor for the memory, such as a cadmium sulphide element, which is connected in series with the main photosensor, such as cadmium sulphide and the like, for facilitating light measurements. In the proposed system described above, the auxiliary photosensor receives the incident light through a different light path from that employing the main photosensor and a bridge circuit is provided for balancing the electric current through the two sensors. The balance for the bridge circuit is obtained by controlling the size of the diaphragm disposed in the light path for the auxiliary sensor. By balancing the bridge circuit, the light value measured by the main photosensor is memorized by the auxiliary photosensor. Further, it is proposed in such a device that a lamp be used in lighting the auxiliary photosensor in the camera for compensating for the value of the resistance of the auxiliary photosensor where taking pictures on a film of largely different photosensitivity. That is, if the range of the film sensitivity employed with the camera is too wide, the variation in resistance of the auxiliary photosensor cannot fully correspond to the variation in sensitivity of the film loaded in the camera. Thus, for compensating for the variation in resistance of the auxiliary photosensor, the lamp which is used as an additional light for the photosensor must be disposed in the camera body.

In accordance with the above-described conventional cameras incorporating an electrically operated shutter with an automatic exposure controlling device, an auxiliary photosensor should be disposed in addition to the main sensor for light measurement and the lamp for compensating for the automatic control of the electric or exposure controlling system should be disposed in the camera. Further, a bridge circuit should be provided in the camera to balance the resistance of the main sensor against the auxiliary sensor which is also carried by the camera. These requirements affect the complexity of mechanical and electrical construction of the camera and the overall size of the camera is inevitably enlarged. Further, it is very difficult to obtain two photosensors having equal characteristics. Thus, there are great difficulties in conventional camera designs. Furthermore, in another well known proposed system of automatic exposure for through the lens system cameras, a photoconductive cell placed in the viewfinder system causes a condenser inserted in the timing circuit, having said cell inserted therein, to memorize a light value before opening of the shutter. After cutting off the incident light due to the swingup position of the mirror accompanying the shutter opening, the time control of said timing circuit is performed on the basis of the memorized light value. In these systems, as aforementioned, the condenser is switched from the light measuring or memorizing circuit to the timing circuit through a selective switch. The contact potential generated by the switching may cause the condenser to additionally charge. This causes the timing control circuit to incorrectly control an exposure.

SUMMARY OF THE INVENTION

The present invention provides an exposure control device for a single lens reflex camera which is able to memorize the light value just before the shutter is released and to thus obtain the right exposure of the film even if the sensor is shut off from the incident light due to swinging up of the mirror during the actual release of the shutter. The present invention further provides an exposure control system for a single-lens reflex camera of the type employing an electrically operated shutter in which only one photosensor for light measurement and light value memorization is provided. The present invention also provides an exposure control device for a single-lens reflex camera of the type employing an exposure control circuit which is not affected by switching accompanying a mirror swingup operation and a shutter opening.

Other objects and advantages of the present invention will be made apparent from the following description taken in conjunction with the accompanying drawing.

DESCRIPTION OF THE PREFERRED EMBODIMENT

Figure 1:
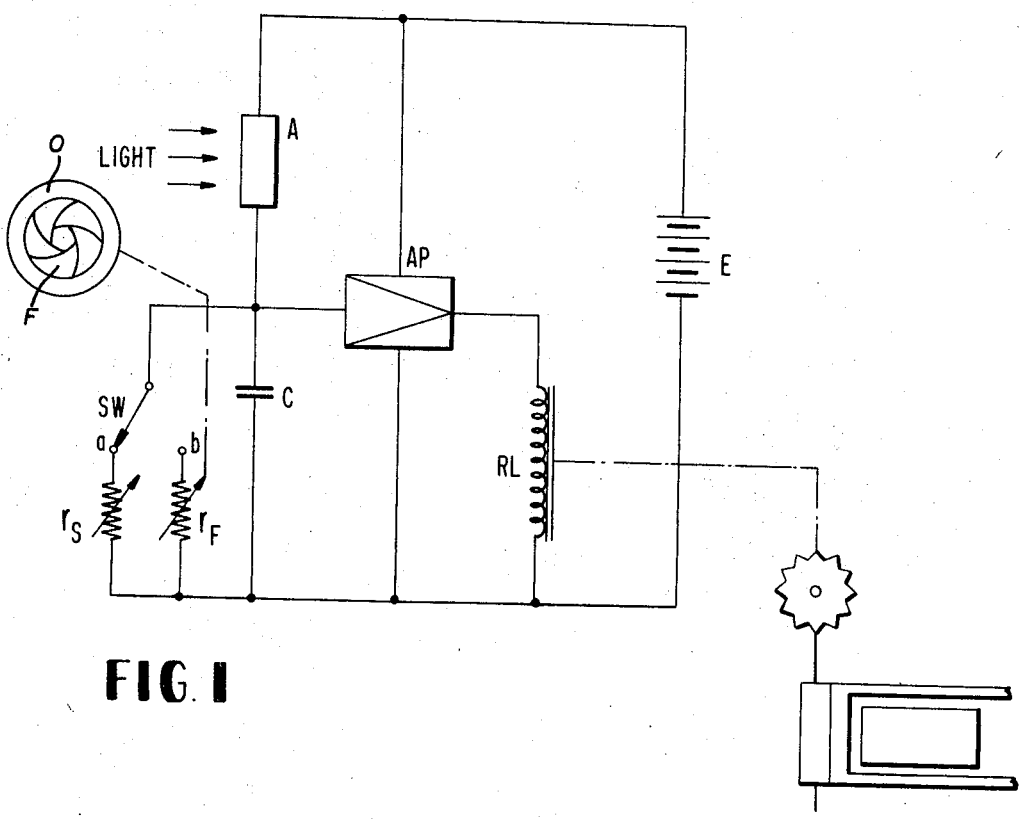
FIG. 1 is an electrical circuit diagram of the exposure control system in accordance with the present invention.
Figure 2:
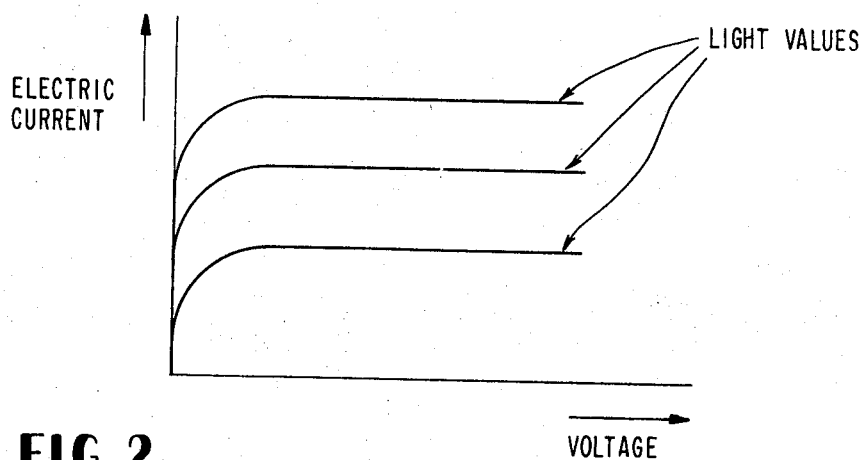
FIG. 2 is a graph of the characteristic curve of the light sensors employable in the exposure control system of the present invention.

Referring to the drawing, a light sensor or photosensor A having a constant-current characterized as shown in the graph of FIG. 2 is a photovoltaic element such as silicon photocells having diode characteristics and is disposed in the view finder optical system (not shown) of a camera incorporating the present invention. The photosensor A is preferably provided behind a lens having an aperture F and the mirror (not shown) which reflects the light through the lens and toward the view finder eyepiece. The photosensor A is series connected via switch SW to an electric source E via either variable resistor $r_s$ or $r_F$. In this respect, switch SW is a single-pole, double-throw switch with stationary contacts $a$ and $b$ associated with variable resistors $r_S$ and $r_F$, respectively. The switch SW also connects the variable resistors in parallel with a condenser C. The condenser C is further connected through amplifier AP to a relay coil $R_L$ with the relay being connected mechanically to a mechanism for releasing the hook for the second blind of the conventional shutter to thereby close the shutter blind. The condenser C is charged by the electrical source E, such as a DC battery, to a value depending upon the resistance of the variable resistor with which it is connected in parallel. The resistance of the variable resistor $r_S$ associated with stationary contact $a$ is varied in accordance with the sensitivity of the film loaded within the camera. The resistance of the other variable resistor $r_F$ and associated with stationary contact $b$ is varied by rotation of the aperture setting ring O of the camera, which controls with aperture F of the picture taking lens in the automatic aperture setting portion of the camera, thus the resistance of the resistor $r_F$ corresponds to the predetermined aperture size of the exposure lens as set by the aperture setting ring.

Upon operation of the exposure control system as constructed and described hereinabove, the photosensor A causes the electric current flowing therethrough to vary in accordance with the light value of incident light coming through the exposure lens of the camera and reflected by the mirror in the camera onto the photosensor A when the camera faces the object to be photographed. If the switch SW associated with the shutter button, is in such a position as to complete the circuit through stationary contact $a$, in this condition, the voltage at the variable resistor $r_S$ is determined by the current passing through the photosensor A and the resistance of the variable resistor $r_S$. The output current of the photosensor A is determined by the light value from the object being photographed and the resistance of the resistor $r_S$ is determined by the sensitivity of the film loaded in the camera. Accordingly, the voltage across the condenser C corresponds to the light value from the object to be photographed and the film sensitivity such that the condenser C is charged to a voltage equal to that across resistor $r_S$ from the current emanating from voltage source E. Then, in response to pushing down of the shutter button (not shown) and swinging up of the hinged mirror out of the way so as to prevent incident light from falling onto the photosensor A, the switch SW changes from a position in contact with stationary contact $a$ and moves to stationary contact $b$ with the variable resistor $r_F$ is connected into the circuit with the condenser C in parallel therewith. In this switching operation, the contact potential which causes charging of the condenser is not coupled to the switch SW and the switch merely changes the resistor from $r_S$ to $r_F$. Also, even if the photosensor A has no incident light falling thereupon, a leak current which is disadvantageous for correct exposure, cannot flow from the condenser C to the photosensor A because of its diode characteristics. In this case, if a photoconductive cell is placed as a photosensor A instead of the photovoltaic cell having diode characteristics according to the present invention, when the switch SW is changed from resistor $r_S$ to $r_F$ with the operation of the mirror, the memorized voltage across the condenser C is affected by the connection between the photosensor A and condenser C because the photosensor A, a photoconductive cell, has a relatively low impedance. Further, in response to pushing down of the shutter button, the automatic aperture setting device operates to set the aperture at a predetermined sign and the first blind of the focal plane shutter starts to run before the film to effect exposure of the same. Since at this time, the photosensor A is blocked from the incident light by the swung up mirror and the electric current passing therethrough ceases, the condenser C memorizes the light value from the object just before pushing down of the shutter button, and, just before the hinged mirror starts to swing up, starts to discharge. The speed of discharge by the condenser C depends on the resistor which the discharged current passes. In this case due to the change in the switch connections for switch SW, the speed of the current discharging from the condenser depends on the resistance of the variable resistor $r_F$ which in turn is determined by the size of the aperture of the camera lens system the capacity of the condenser C and the voltage of the condenser. When the discharging voltage drops below a predetermined value, the amplifier AP operates to release the hook holding the second blind of the shutter, by actuating the relay coil $R_L$. Thus, the shutter is closed and the exposure of the film is completed. The duration of exposure is, accordingly, controlled by the aperture size of the exposure lens, and the voltage of the condenser C which corresponds to the light value of the object to be photographed, just before the shutter is released.

The logarithmic relationship between the discharging speed of the condenser C and the voltage drop due to the simple combination of the condenser C and the resistor $r_F$ is amended into a linear relationship by the correction circuit incorporated within the amplifier AP.

It is apparent that the electrically operated shutter is similarly controlled even if the variable resistor $r_S$ and the variable resistor $r_F$ are reversely connected to the switch SW, that is, the former is connected to the switch SW when discharging the condenser and the latter is connected thereto when charging the condenser.

In accordance with the present invention, there are numerable advantages as described hereinbelow, as clearly understood from the above-described description, both as to construction and operation of the system in accordance with the present invention.

Since the photosensor has a constant-current characteristic and is employed as the sensor for light measurement as well as the memorizing member for memorizing the light value, there is no need to provide an auxiliary photosensor for keeping the measurement after the main sensor is blocked from the incident light by the presence of the swungup mirror. In the conventional cameras, a second sensor should be provided and switched into the circuit after the main sensor is blocked from the incident light. Thus, there is the further advantage that the mechanical and electrical equipment accompanying such conventional systems is completely eliminated by the present invention.

Further, since only one photosensor is required within the camera body, the light-measuring optical system is unchanged in the present invention from that of the conventional through-the-lens type light-sensing system. That is, the exposure control system in accordance with the present invention may be readily applied to a conventional through-the-lens type single-lens reflex camera. Further, since in the exposure control system in accordance with the present invention, a photosensor such as an element formed of silicon or the like having a constant-current characteristic is employed, the exposure control of the camera is not affected by the variation in the power voltage characteristics of the sensor element due to wear and tear thereof.

Though the invention has been described in detail with particular reference to an embodiment thereof, it will be understood that various modifications and variations can be effected in the scope of the invention as described herein above and as defined in the appended claims.

I claim:

1. In an exposure system for a single-lens reflex camera having a shutter, the improvement comprising:
   a. an exposure measuring and memorizing circuit including a photosensor having diode characteristics and disposed in the viewfinder optical system of said camera, said photosensor being out of the path of incident light when said shutter releases, a condenser connected in series with said photosensor and adapted to memorize the amount of light incident on said photosensor, and a first resistor connected is parallel with said condenser through a switch; and
   b. a timing circuit including an electrical relay for operating said shutter, said relay connected to said condenser, and a second resistor connected in parallel with said condenser through said switch, said switch operating when said shutter is released and selectively changing the connection of said condenser from said first resistor to said second resistor.

2. The exposure control system as set forth in claim 1 wherein said first resistor is a variable resistor whose resistance value is controlled in accordance with the sensitivity of the film-loaded within said camera and said second resistor is a variable resistor whose resistance value is controlled in accordance with the size of the aperture of said camera wherein said second resistor is operatively coupled to an aperture setting ring.

* * * * *